United States Patent [19]
Streander

[11] 3,719,103
[45] March 6, 1973

[54] LAMINATED GEAR CONSTRUCTION

[75] Inventor: George W. Streander, Alamogordo, N. Mex.

[73] Assignee: Design Systems, Inc., Alamogordo, N. Mex.

[22] Filed: Oct. 7, 1971

[21] Appl. No.: 187,438

[52] U.S. Cl. ................74/445, 74/440, 74/447
[51] Int. Cl. ................F16h 55/12, F16h 55/18
[58] Field of Search.........74/445, 447, 440, 439, 434

[56] References Cited

UNITED STATES PATENTS

| 1,482,847 | 2/1924 | Johnston | 74/434 X |
| 1,647,480 | 11/1927 | Starkey | 74/440 |
| 2,839,943 | 6/1958 | Caldwell et al. | 74/434 X |

Primary Examiner—Leonard H. Gerin
Attorney—Harvey B. Jacobson

[57] ABSTRACT

A gear body including an edge portion of predetermined configuration and of laminated construction including a center ply of plastic material and a pair of opposite side plies constructed of more rigid material. The aforementioned edge portion of the gear body has gear teeth formed therein with each of the gear teeth composed of aligned gear teeth segments formed in the three plies of the edge portion and with the gear tooth segments formed in the center plastic ply of the gear body including tooth segments defining surfaces projecting at least slightly outwardly beyond the corresponding tooth segment defining surfaces comprising the gear teeth formed in the opposite side plies of the gear body.

7 Claims, 6 Drawing Figures

PATENTED MAR 6 1973 3,719,103

George W. Streander
INVENTOR.

BY Clarence A. O'Brien
and Harvey B. Jacobson
Attorneys 3,719,103

LAMINATED GEAR CONSTRUCTION

The laminated gear construction of the instant invention has been designed to provide improved gears having the self lubricating and quiet running features normally associated with plastic or Nylon gears and yet retaining the load capacity characteristics of gears constructed of harder metals.

It has been discovered that a laminated gear body or a gear body with a laminated peripheral edge including opposite side plys of rigid metal and a center ply of plastic material may have gear teeth cut in the peripheral edge by conventional means and that the plastic material of the center ply will yield under the pressure of the gear teeth cutting tool in a manner such that after the gear teeth are cut in the multi-ply peripheral edge of the gear body the teeth segments formed in the center plastic ply will expand so that the gear teeth defining edges thereof project at least slightly outwardly of the corresponding gear teeth defining edges cut in the opposite side plies. By this construction a gear may be meshed with another gear in a manner eliminating backlash and preventing metal to metal contact between the gears, affording self lubricating qualities and retaining at least a substantial portion of the strength advantage enjoyed by metal gears over plastic gears.

Accordingly, it is the main object of this invention to provide a laminated gear construction.

Another object of this invention, in accordance with the immediately preceding object, is to provide a laminated gear construction which may be formed by at least two different manufacturing processes.

Still another important object of this invention is to provide a gear construction that enjoys self lubricating and quiet running characteristics while maintaining a high loading capacity.

Another object of this invention is to provide a gear construction that may be utilized in a manner eliminating substantially all backlash normally associated with gear trains.

A final object of this invention to be specifically enumerated herein is to provide a laminated gear construction in accordance with the preceding objects which will conform to conventional forms of manufacture, be of simple construction and easy to use so as to provide a device that will be economically feasible, long-lasting and relatively trouble free in operation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

Figure 1:
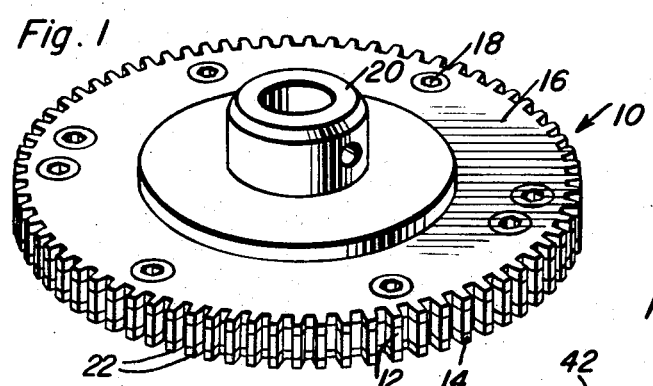
FIG. 1 is a perspective view of a laminated gear constructed in accordance with the present invention.
Figure 2:
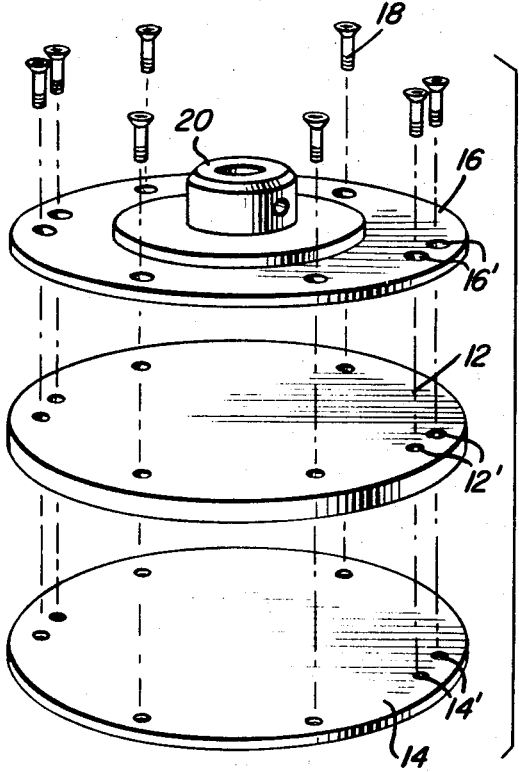
FIG. 2 is an exploded perspective view of a gear blank constructed in accordance with the present invention before the peripheral teeth are formed on the gear blank.
Figure 4:
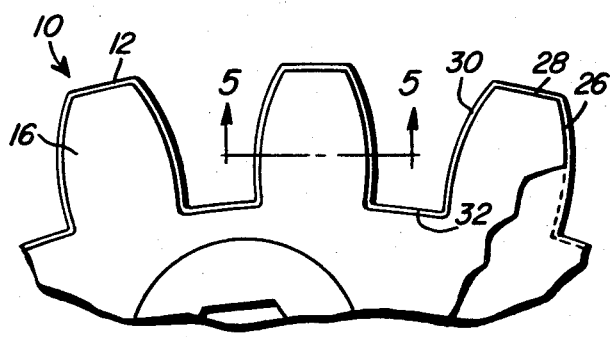
FIG. 4 is an enlarged fragmentary plan view of the gear blank of FIG. 1.

Referring now more specifically to the drawings the numeral 10 generally designates a first form of laminated gear constructed in accordance with the present invention. The gear 10 includes a center panel 12 constructed of a polymer plastic and a pair of opposite side plates 14 and 16. The panel 12 has a plurality of peripherally spaced apertures 12' formed therein, the plate 14 has a plurality of threaded bores 14' formed therein and the plate 16 has a plurality of peripherally spaced countersink bores 16' formed therein. The apertures 12 and the bores 14' and 16' are registered and a plurality of headed fasteners 18 are utilized to secure the plates 14 and 16 together with the panel 12 disposed therebetween. The fasteners 18 are threaded into the bores 14' as will be evident from FIG. 2 of the drawings and the plate 16 includes a central mounting boss 20 by which the gear 10 may be mounted on a suitable shaft.

After the blank panel 12 and the blank plates 14 and 16 are secured together by the fasteners 18 in order to form a gear blank, peripheral teeth 22 are cut in the periphery of the blank by the rotary gear tooth cutting tool 24 in a conventional manner.

The plates 14 and 16 are constructed of a material (such as metal) which is harder and not as yielding as the polymer plastic of which the panel 12 is constructed. Thus, when being acted upon by the gear teeth cutting tool 24, the plates 14 and 16 do not yield under the force of the cutting tool 24. On the other hand, inasmuch as the panel 12 is constructed of plastic material, the portions of the panel 12 having the teeth 28 cut therein yield under the pressure of the cutting tool 24 with the result that some expansion of the plastic material of the panel 12 occurs after the force of the cutting tool 24 is relieved. This expansion of the panel 12 results in the surfaces 26, 28, 30 and 32 of each gear tooth segment cut in the panel 12 being displayed outwardly of the corresponding surfaces of the same gear teeth segments formed in the plates 14 and 16. The expansion of the plastic material of which the panel 12 is constructed resulting in the surfaces 26, 28, 30 and 32 being displaced outwardly beyond the corresponding surface portions of the plates 14 and 16 may be slightly enhanced by the panel 12 being compressively clamped between the plates 14 and 16.

Figure 6:
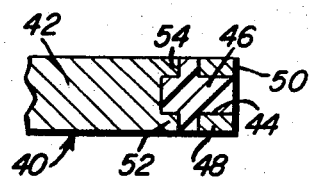
FIG. 6 is a fragmentary sectional view illustrating the manner in which the center plastic ply of the gear blank may be formed by an injection molding process.

However, with attention now invited more specifically to FIG. 6 of the drawings, it may be seen that a similar gear wheel 40 may be constructed by utilizing a main gear blank 42 constructed of rigid metal and having a radially outwardly opening peripheral groove 44 formed therein in which a central ply 46 of plastic material has been formed by injection molding.

The central groove 44 formed in the gear blank 42 defines a pair of opposite side flanges 48 and 50 between which the groove 40 is disposed and the flanges 48 and 50 are provided with registered bores 52 and 54, respectively, spaced circumferentially thereabout whereby portions of the plastic material 46 injected in the groove 44 will occupy the bores 52 and 54 and thus lock the center ply 46 in position between the flanges 48 and 50.

Figure 3:
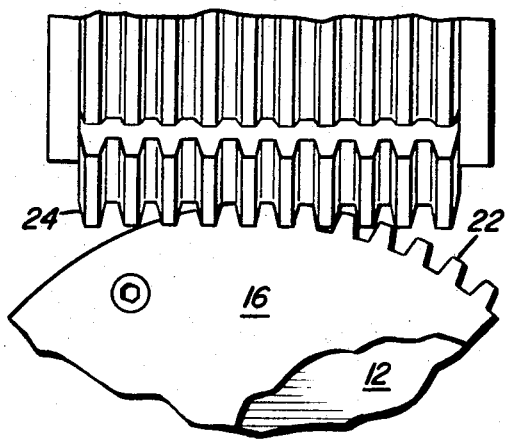
FIG. 3 is a fragmentary plan view of the laminated gear blank of FIG. 2 in the process of having gear teeth cut therein.
Figure 5:
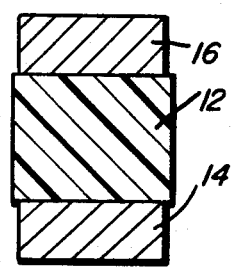
FIG. 5 is an enlarged sectional view taken substantially upon the plane indicated by the section line 5—5 of FIG. 4.

After the gear wheel blank illustrated in FIG. 6 has been formed, it may have gear teeth corresponding to the gear teeth 22 formed therein by the manner illustrated in FIG. 3 and with the same result that the gear teeth portions formed in the ply 46 will expand outwardly of the corresponding gear teeth portions or surfaces cut in the flanges 48 and 50.

By having those segments of the gear teeth 22 formed in the panel 12 and the ply 46 disposed with their teeth segment defining surfaces projecting at least slightly outwardly beyond the corresponding teeth defining surfaces of the tooth segments cut in the plates 14 and 16, the gear wheels 10 and 40 may be utilized either in conjunction with similar gear wheels or conventional metal gear wheels with substantially all backlash eliminated. Further, the gear wheels 10 and 40 need no lubrication and run quietly with reduced friction. Also, the gear wheels 10 and 40 inherently have increased torque rating over similar all polymer or other plastic gears and contact between the surfaces of the gear segments of the panel 12 is more evenly distributed from a tooth contact standpoint. Also, because of the metal plys of the gear wheels 10 and 40, bending or compression as well as other shaped distorting displacement of the teeth segments formed therein the panel 12 is limited and thus controlled.

It is believed evident that many different types of gears may be constructed in accordance with the present invention. Also, gear wheels constructed in accordance with the present invention have considerably higher torque ratings than gear wheels of substantially the same size and constructed entirely of polymer plastics such as Nylon and Teflon.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A gear body comprising a center panel of plastic material and a pair of opposite side plates constructed of more rigid material, said plates being secured together with said panel clamped therebetween to form a laminated panel. Said laminated panel including an edge portion having gear teeth formed therein each consisting of a pair of gear tooth segments formed in said plates and a gear tooth segment formed in said panel, the edges of said gear teeth segments formed in said panel projecting slightly outwardly of the corresponding edges of the gear teeth segments formed in said plates.

2. A gear body including an edge portion having gear teeth formed therein, at least said edge portion being of laminated construction including a center ply of plastic material and a pair of opposite side plies constructed of more rigid material, the teeth formed in said edge portion being defined by aligned tooth segments formed in said plies, the edges of said center ply defining the tooth segments thereof projecting at least slightly outwardly of the corresponding edges defining the tooth segments of the opposite side plies.

3. The combination of claim 1 wherein said plates include circumferentially spaced aligned apertures formed therethrough, and a plurality of tension fasteners secured through said apertures biasing said plates together so as to clampingly engage said panel therebetween.

4. The combination of claim 1 wherein said center panel is of a greater thickness than said plates.

5. The combination of claim 2 wherein said edge portion has an outwardly opening central groove formed therein, said center ply being seated in said groove.

6. The combination of claim 5 wherein the confronting surfaces of said gear body defining opposite sides of said groove have recesses formed therein opening into said groove, said center ply including integral portions thereof keyed in said recesses.

7. The combination of claim 6 wherein said center ply is of a greater thickness than said opposite side plies.

* * * * *